Figure 1:
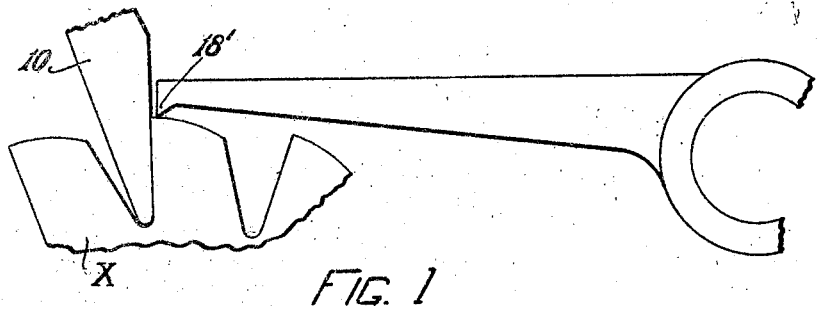

S. McKAY.
METHOD OF ADJUSTING ROTARY CUTTERS.
APPLICATION FILED AUG. 16, 1911.

1,079,420.

Patented Nov. 25, 1913.

2 SHEETS—SHEET 1.

WITNESSES

INVENTOR
SIMON McKAY
BY
ATTY.

UNITED STATES PATENT OFFICE.

SIMON MacKAY, OF ATHOL, MASSACHUSETTS, ASSIGNOR TO UNION TWIST DRILL COMPANY, OF ATHOL, MASSACHUSETTS, A CORPORATION OF MASSACHUSETTS.

METHOD OF ADJUSTING ROTARY CUTTERS.

1,079,420.   Specification of Letters Patent.   Patented Nov. 25, 1913.

Application filed August 16, 1911. Serial No. 644,445.

*To all whom it may concern:*

Be it known that I, SIMON MacKAY, a citizen of the United States, residing at Athol, Massachusetts, have invented certain new and useful Improvements in Methods of Adjusting Rotary Cutters, of which the following is a specification.

This invention relates to the adjustment of a milling cutter or like tool having teeth formed with radial relief on their outer or peripheral edge and having their forward or cutting edge radial or substantially radial.

In my prior application, Serial No. 574,345, I set forth a combination of my gaging device with a certain grinding machine. In my present invention, while I shall show as illustrative embodiment the same form of gage and machine, I shall deal with the method of accomplishing this result, employing the specific device which I have heretofore shown merely as a means of illustration of the manner in which I accomplish the results sought.

The particular result desired to be effected in grinding a milling cutter or other device of this sort is the removal of a certain predetermined depth on the face of the tooth and the removal of that depth by successive grindings. In other words, it is greatly desired to grind away with absolute accuracy the predetermined amount of each tooth and to accomplish this by successive operations and all under the control of a gage in which while absolutely accurate may be accomplished in a simple manner and at a single setting or adjustment.

To those skilled in the art, the practical difficulties of ordinary cutter tooth grinding will be well understood. The art of gaging the length of the tooth by a movable gage in contact with the relieved gage of the outer face of the tooth is also well understood but in my invention it must be remembered that instead of gaging the length of the tooth which is to be ground, I am gaging a lateral distance, to wit, the depth to which the face of the tooth is to be ground, that is, the gaging or grinding is not lengthwise or toward its center but circumferentially or from front to rear of the tooth. If then it be borne in mind that while I apply the gage to the relieved peripheral tooth, I am actually measuring the front and rear adjustment by which a predetermined amount of the cutting of the face of the tooth is presented to be ground away. It will be seen that my method involves a wholly new manner of dealing with the grinding proposition. The gist of my invention lies in a gaging by which a predetermined setting movement of the face of the tooth relative to the grinding face of the wheel is accomplished by a gaging of the eccentricity of the outer edge of the tooth; in other words by the gaging of its radial relief.

The advantages of my method will appear further in detail as I discuss the matter more at length in my specification.

Figure 2:
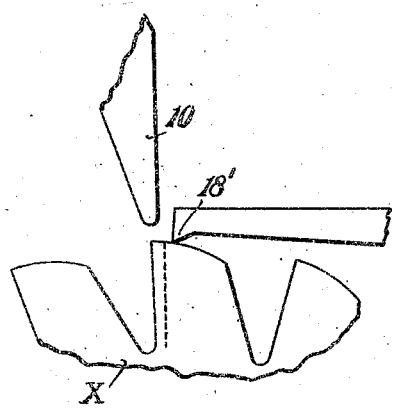
Figure 3:
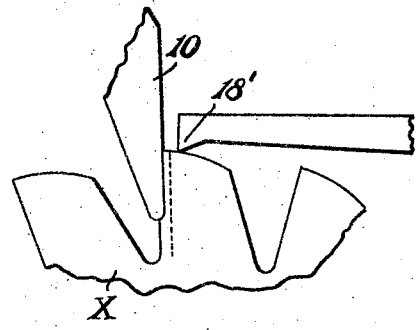
Figure 4:
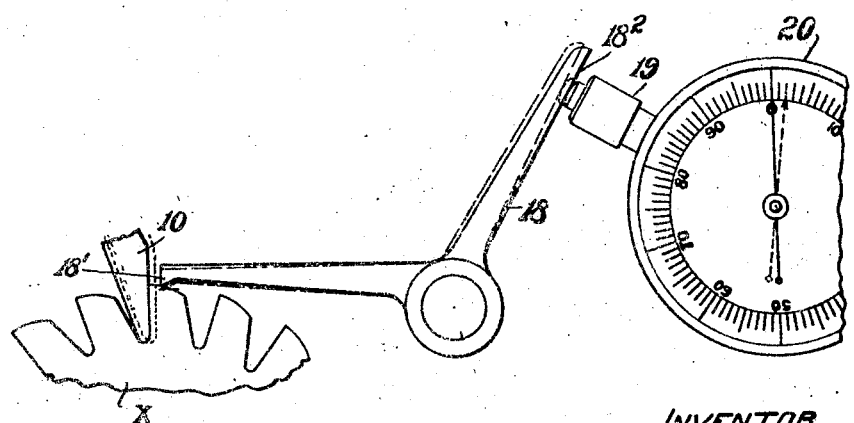
Figure 5:
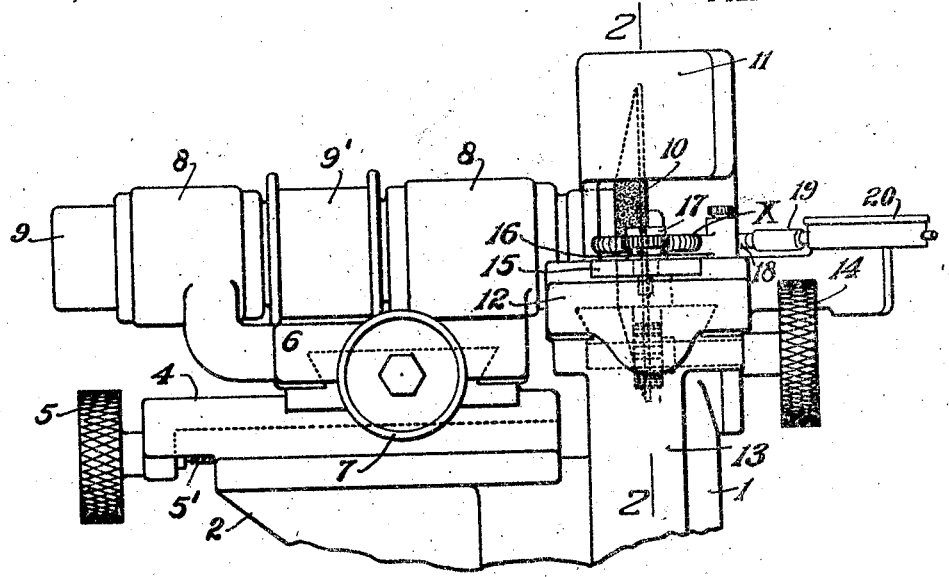

Throughout specification and drawings like reference numerals are employed to indicate corresponding parts and in the drawings:

Figure 1 is a diagrammatic view showing a portion of the grinding wheel, a portion of the cutter and an indicator arm set in the initial step of my method. Fig. 2 is a similar view showing the tooth adjusted and wheel and cutter separated. Fig. 3 is a still further view showing the grinding wheel making a partial cut down toward an indicated limit. Fig. 4 is a view showing the position of the tooth and grinding wheel with regard to the indication thereof before and after grinding. Fig. 5 is a side view of a grinding machine adapted for the practice of my invention and Fig. 6 is a plan view of the same.

Referring to the drawings I have indicated at X a fragment of the periphery of a milling cutter having substantially radial front faces to the tooth and having the usual peripheral or radial relief along the outer edge.

Figure 6:
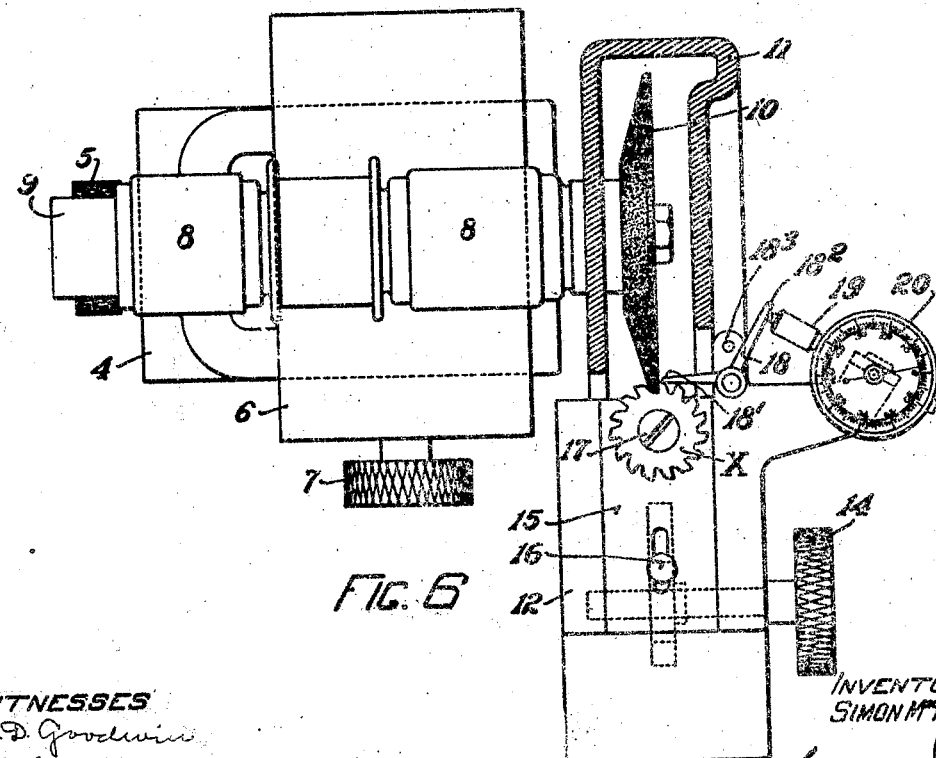

Referring particularly to Figs. 1 to 4, inclusive, I have shown in conjunction with the cutter which is understood to be rotatably mounted as shown in Fig. 6, a portion of the grinding wheel indicated at 10 and the indicating lever 18'. In order to understand the purpose of my invention I will first describe the adjustment of the tooth of the cutter X relative to the grinding wheel 10. In Fig. 1 it is supposed that the underground tooth of the cutter X is brought up against the face of the grinding wheel 10. In this adjustment the grinding wheel 10 and the cutter X are moved at right angles to each other. This is the position indicated in full lines in Fig. 4 and in that position the point of the indicator 20 is preferably set at zero. As shown in Fig. 2 the cutter X and the wheel 10 are separated. The particular means of accomplishing these relative movements in my preferred machine will be more fully described later on. In Fig. 2 I have also shown the tooth of the cutter advanced to secure a predetermined depth of cut which is indicated by dotted lines. The position of the tooth of the cutter X in this position is shown in Fig. 4 in dotted lines. In Fig. 4 it will be seen that the indicator point which was set at zero for the first adjustment of the tooth to the wheel prior to grinding shows a reading of two one-thousandths which is the exact amount of the cut desired to be made in sharpening.

In Figs. 5 and 6 I have shown the particular form of grinding machine set forth in my prior application above referred to. In order to make clear the exact practice of my invention as I shall hereafter describe it, I shall make particular reference to this form. The machine consists of a suitable pedestal 1 provided with a lateral bracket 2 upon which is supported a slide 4 controlled by the milled knob 5. 6 is a cross slide, also controlled by a knob 7 and on this is supported in suitable bearings 8 a spindle 9 upon the head of which is mounted an abrasive wheel 10. The wheel 10 is covered by a hood 11 which is open on one side and adjacent to this opening is a work supporting slide 12 movably mounted on a bracket 13 and controlled by a milled knob 14. 15 is a plate adjustable on the slide 12 by a set screw 16 which passes through a slot on the plate. Near the end of the plate is a screw stud 17 upon which is centered a cutter, as indicated at X. Just in advance of the cutter centering stud 17 is pivotally mounted a gaging lever 18 which at its forward end 18' is formed with a tooth engaging point and at its rearward end 18² engages the actuating rod 19 of an adjustable spring multiplying indicator 20. Power is applied to the machine through a pulley 21 fixed on a disk spindle 9.

The operation of my device is as follows:

It is supposed that the emery wheel 10 has been properly trued off on its front face and is in condition to accurately grind the face of a tooth. A suitable plate 15 is selected which has a stud 17 of the right diameter to fit the cutter to be sharpened and with the cutter clamped on the stud the plate 15 is so adjusted that the teeth of the cutter, when in contact with the gage lever 18 will move the lever slightly away from a stop pin 18³ which is set in the forward end of the slide. The plate 15 is then clamped through the thumb screw 16. The emery wheel 10 is then adjusted by the milled knob 7 so that it will come to the bottom of the tooth of the cutter X when the slide 12 is moved forward to the limit of its motion. With the emery wheel 10 at rest the face of the tooth is brought into contact with the wheel and the cutter is clamped upon the plate 15 by the screw 17. It is preferable that the indicator 20 be adjustable, so as to bring the dial until the pointer reads on zero. The screw is then loosened slightly to release the cutter X on the plate and with the slide 13 drawn back the cutter is rotated to the left until the indicator pointer shows a movement of one or two thousandths of an inch which is usually the amount of grinding desired. The cutter is then clamped by tightening the screw 17 and the indicator dial is brought again to zero. With the emery wheel drawn back by turning the knob 5 so that it will clear the cutter tooth the knob 14 is turned to move the slide 13 back and forth past the face of the emery wheel and the emery wheel is itself advanced by successive slight turns on the knob 5 until the proper amount, that is, one or two thousandths, has been removed from the face of the tooth. The slide 13 is then drawn back, and the cutter loosened and turned until the indicator reads on zero with the end 18' of the lever 18 in contact with the next tooth which is then ground in the same manner as that just described. In this way it will be seen that each tooth is ground with absolute accuracy on substantially a radial line and each tooth will have an absolute uniform length.

Various modifications may obviously be made in the structure and operation of my device, all without departing from the spirit of my invention if within the limits of the appended claims.

What I therefore claim and desire to secure by Letters Patent is:

1. The method of grinding a radially relieved milling cutter, consisting in establishing a predetermined relative feed movement of cutter and grinding wheel, in setting the forward face of a tooth to be ground against the face of the grinding surface of said wheel, in separating said cutter and said wheel, in advancing the face of said cutter past the plane of said face grinding surface in said wheel a predetermined amount, as indicated by a gage applied to the outer edge of the tooth.

2. The method of setting a rotary tooth cutter for grinding which consists essentially in determining the proper circumferential adjustment of the cutter relative to the grinder by contact of a measuring device with the relieved periphery of a tooth.

In testimony whereof I affix my signature in presence of two witnesses.

SIMON MacKAY.

Witnesses:
JOHN W. BOYNTON,
HARRY M. BUTLER.